April 10, 1934.  J. L. BATCHELDER  1,954,690
SWITCH FOR DIRECTION INDICATORS
Filed May 27, 1930  3 Sheets-Sheet 2
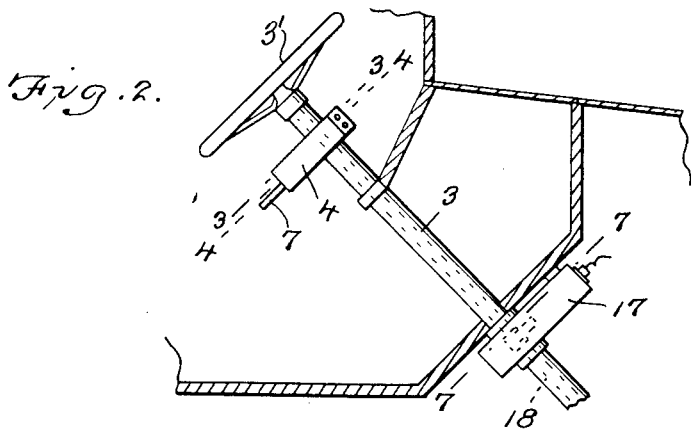
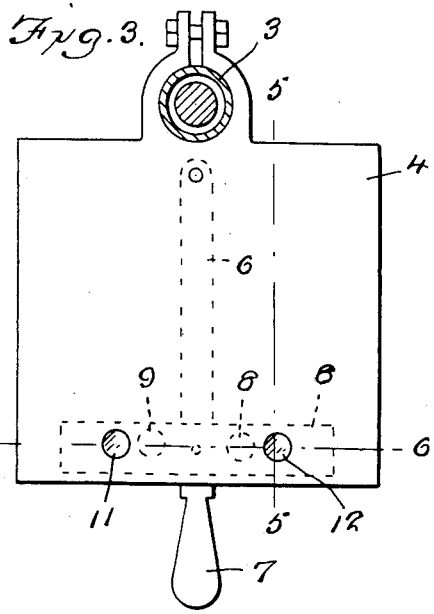
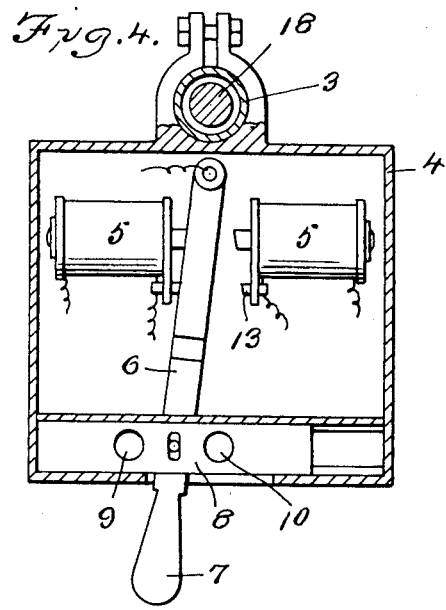
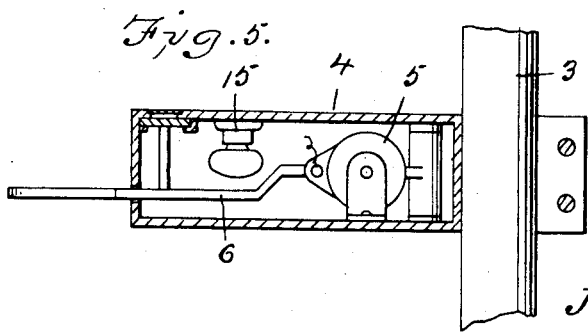
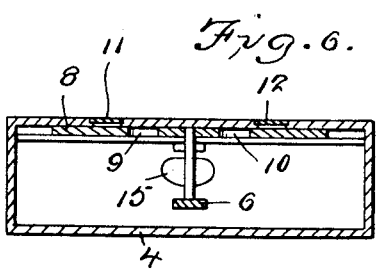
John L. Batchelder
INVENTOR
BY Victor J. Evans
ATTORNEY April 10, 1934.   J. L. BATCHELDER   1,954,690
SWITCH FOR DIRECTION INDICATORS
Filed May 27, 1930   3 Sheets-Sheet 3
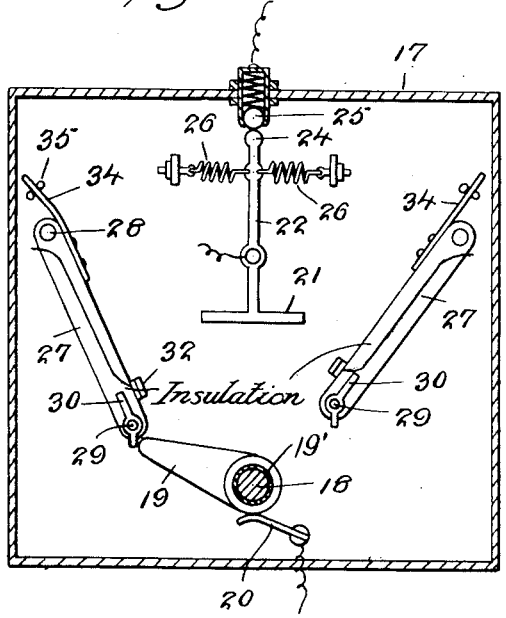
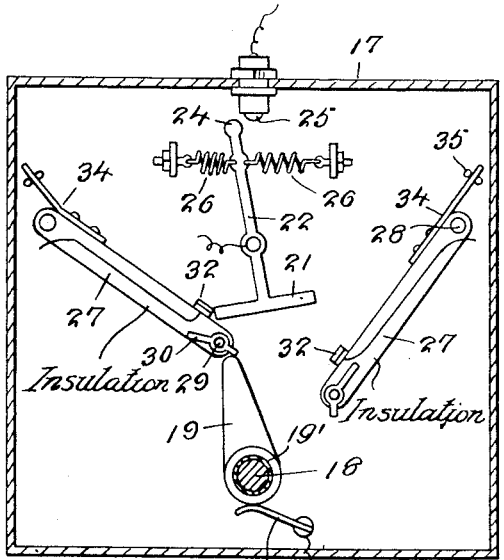
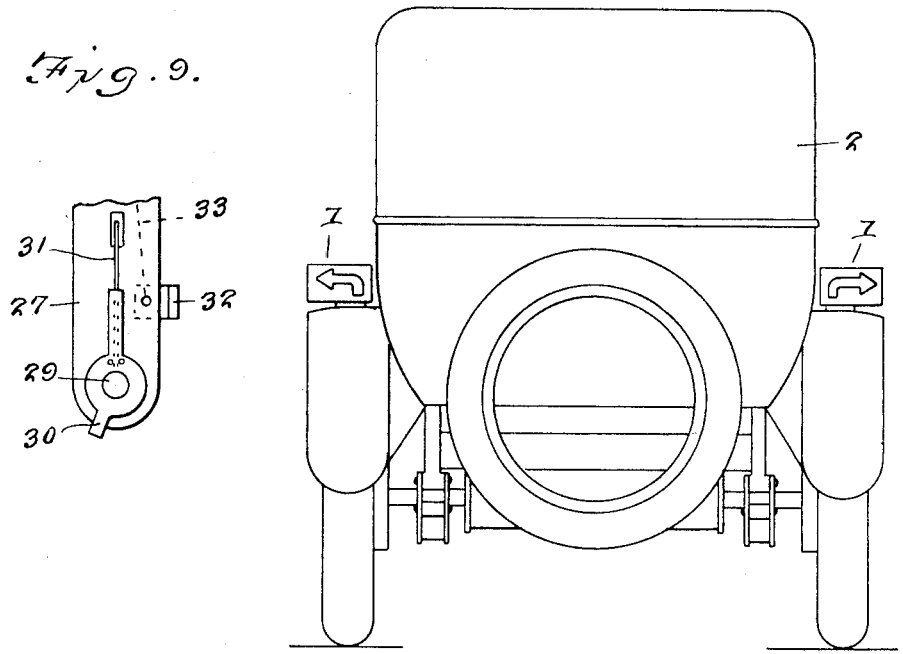
John L. Batchelder INVENTOR
BY Victor J. Evans
ATTORNEY Patented Apr. 10, 1934

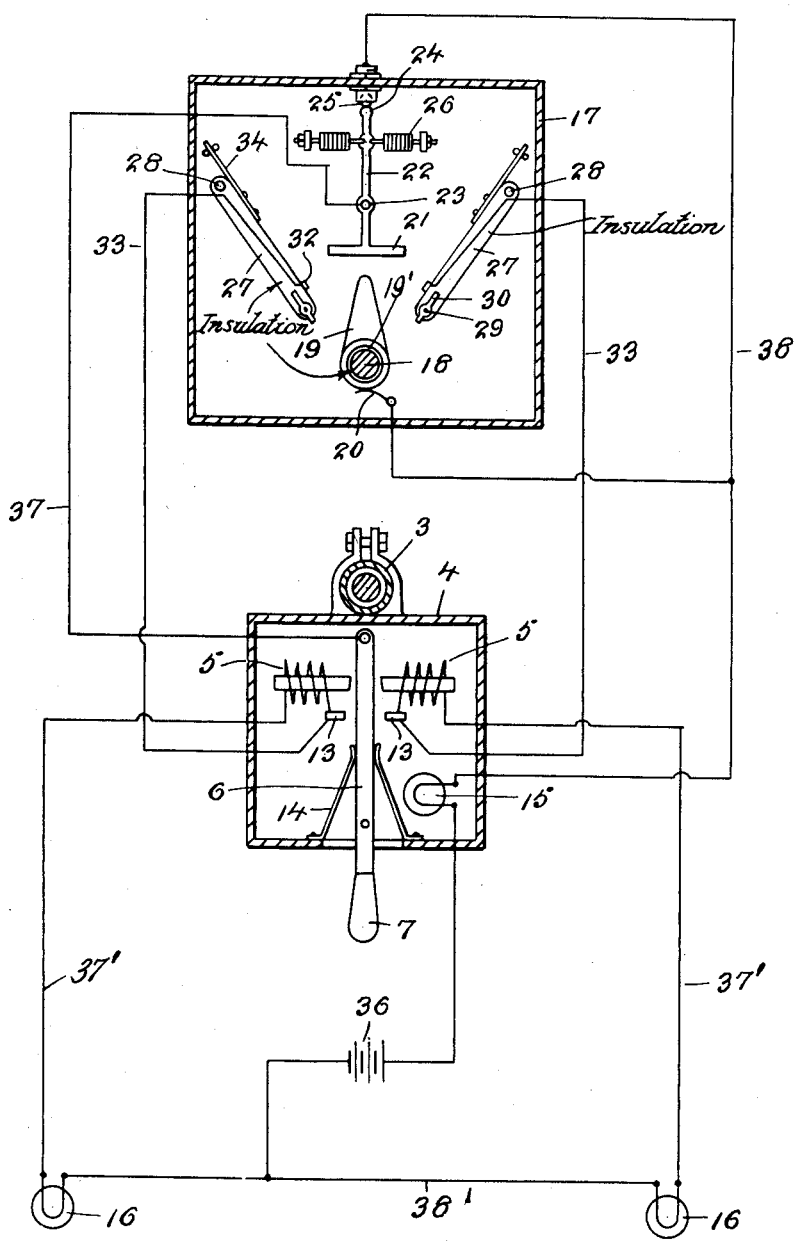

1,954,690

UNITED STATES PATENT OFFICE 1,954,690

SWITCH FOR DIRECTION INDICATORS

John L. Batchelder, Sand Springs, Iowa

Application May 27, 1930, Serial No. 456,152

1 Claim. (Cl. 200—59)

The object of my present invention is the provision of a switch for an electric direction signal for automobiles which includes two circuit makers and breakers, one hand operated and the other operated by the turning of the steering post, and which may be independently operated and wherein the hand operated device is thrown to circuit breaking position by the steering post device after the automobile has signaled and taken the desired course and the steering wheel is turned to again cause the vehicle to travel in a straight direction.

A further object is the provision of a direction signal for automobiles of such construction and arrangement that the signals will be flashed in ample time to warn vehicles or pedestrians of the course the driver of the automobile is to take and wherein the driver has visible knowledge that the proper signal is being displayed.

A further object is the provision of a direction signal that shall be visible both ahead and to the rear of the automobile, which may, if desired, be observed by the driver, which is simple in construction, positive in action and which may be easily and readily installed on any type of automobiles or like motor propelled vehicles.

The invention will be fully and comprehensively understood from a consideration of the following detailed description when read in connection with the accompanying drawings which form part of the application.

In the drawings:

Figure 1 is a diagrammatic view of the improvement, the casings for the circuit makers and breakers being in section as are the steering post or shaft and the steering post shaft or trunnion of the automobile.

Figure 2 is a side elevation of the improvement in applied position, the forward portion of the automobile being in section.

Figure 3 is a sectional view approximately on the line 3—3 of Figure 2.

Figure 4 is a sectional view approximately on the line 4—4 of Figure 2.

Figure 5 is a sectional view approximately on the line 5—5 of Figure 3.

Figure 6 is a sectional view on the line 6—6 of Figure 3.

Figure 7 is a sectional view approximately on the line 7—7 of Figure 2, the cam or wiper element on the steering post being thrown to engage one of the switch arms.

Figure 8 is a view substantially similar to Figure 7 but illustrating the position of parts when the steering post and the cam element thereon are almost in neutral position.

Figure 9 is a detail elevation looking toward the end of one of the switch arms.

Figure 10 is a rear elevation of an automobile with the signal lamp housings thereon.

The lamp housings 1 are to be arranged on the opposite sides of an automobile 2. In the showing of the drawings the signal housings are placed on the top of the rear fenders of the automobile but obviously may be differently positioned so that the motorist or pedestrian following the automobile may observe the signal lamps from the rear thereof and likewise that the signal lamps will be discernible from the front of the automobile. Both of the lamp housings have their front and rear faces provided with sight openings that are in the nature of arrows which are pointed outwardly and these openings are closed by translucent plates which are differently colored. For instance, the lamp housing on the right side of the automobile may have its arrows covered by orange colored plates and those on the left housing may have their arrows covered by green colored plates. These colors are not essential as other different colors may be employed but it is desirable that the colors of the arrows on the right and left hand side housings be different so that vehicles and pedestrians will be readily acquainted regarding the course the driver of the automobile is to take when the bulbs in either of the lamp housings are flashed.

Clamped on the steering post column 3, preferably directly below the steering wheel 3' there is the casing 4 for a circuit maker. The circuit maker includes oppositely disposed electro-magnets 5 and a pivotally supported lever 6 whose insulated handle end 7 is disposed outward of the casing, the casing having a suitable opening for the passage of the handle. The lever is pivotally but loosely connected to a slide shutter 8 and actuates the circuit to bring transparent openings 9 and 10 in alinement with openings 11 and 12 in the top of the casing. Obviously the openings 11 and 12 may have arranged therein transparent plates instead of such plates being arranged in the slide or shutter 8 and the openings in the shutter 8 register only with the openings 10 and 12 when the switch lever is thrown into contacting engagement with either of the magnets 5. The colors of the openings correspond to the colors of the transparent arrows in the signal housings.

In addition to the cores of the electro-magnets 5 the edges of the switch or contacts thereon are swingable to engage with contacts 13 supported at the front or confronting ends of the electro-magnets. The switch lever 6 is normally retained centrally between the contacts 13 and electromagnets or in neutral position by spring means 14. In the casing 4 there is a bulb 15 which is illuminated when the circuit for the bulbs 16 in either of the lamp housings 1 is made.

The numeral 17 designates a casing for a combined circuit maker and breaker. This casing is fixed so that the confronting ends of the steering post column are attached thereto and, in the showing of Figure 2 of the drawings is located below the front floor board of the automobile. The casings 4 and 17 are insulated from the steering post and from the steering post column.

The steering post 18 at the part thereof received in the casing 17 has fixed thereon a cam finger 19 which is insulated from the steering post by an insulating sleeve 19'. The finger is, of course, of metal and may, if desired, be insulated from the steering shaft or post 18. The rounded end of the cam 19 is contacted by a spring metal wiper member 20 and this member is wired in the electric circuit as will hereinafter be explained.

The pointed end of the cam trip member 19 is normally disposed opposite the lateral or T-head 21 of a contact carrying arm 22, the said arm being pivoted, as at 23, in the casing 17. The contact 24 on the end of the arm 23 is in engagement with a ball or like contact 25 that is suitably mounted in the casing 17 and which contact 25 is also wired in the electric circuit. Oppositely directed and preferably adjustably supported springs 26 are arranged in the casing 17 and normally hold the contact carrying arm 22 in central position, or in the position disclosed by Figure 1 of the drawings.

Arranged to the opposite sides of the contact carrying arm there are switch arms 27, respectively. The switch arms have what I will term their outer ends pivoted, as at 28, but their inner ends are in the path of engagement with the trip cam 19. The confronting inwardly inclined ends of the switch arms 27 have pivotally secured thereon, as at 29, switch trigger members 30 that are normally held in one position by the springs 31 which have their ends fixed to the switch arms 27 and it is with these switch triggers that the trip cam 19 is engageable. The arms 27 are preferably not of electric conducting material but the same have arranged upon their inner faces contact plates 32 to which are connected suitable wires 33 that lead to the contacts 13 in the casing 4. The arms 27 are held angularly through the medium of flat springs 34 fixed on the inner or confronting edges of the arms and movable through spaced guides 35 and these flat springs and guides have proved sufficient to hold the arms at desired angles and return the same to initial position after being swung by contact with the trip cam 19 upon the turning of the steering post or shaft 18.

The contact 25 has a wire connection 38 with the bulb 15 and with the battery 36 of the electric circuit. The contact carrying arm 22 has a wire connection 37 with the inner end of the switch lever 7 and the electro-magnets have wire connections 37' with the respective bulbs 16 in the lamp housings and these bulbs, of course, have a wire connection 38' with the battery wire, while the switch 20 is wired to the conductor 38.

It is to be noted that the outer ends of the contacts 32 are arranged at an angle and are in the path of engagement with the inner end of the pivoted members 30 which I have termed the triggers. Should the driver not desire to operate the switch lever of the circuit maker it is merely necessary for him to turn the steering post which will bring the trip or wiper cam 19 against the outer angle end of one of the triggers, in accordance with the direction in which the steering wheel 3' of the vehicle is to move. This will bring the second end of the trigger against the contact 32 so that the circuit will be completed between the battery and the desired lamp bulb 16 in the predetermined lamp housing by the circuit traveling through either of the wires 33 and the wire 37. Should, however, it be desirable that the driver operate the hand switch before turning the steering wheel or post 18 connected thereto, the circuit will be directed through the desired contact 13 to the battery which, of course, will energize one of the electro-magnets and hold the switch lever in engagement with the desired contact. The circuit travels from the battery to the mentioned electro-magnet and to the desired lamp bulb 16 and likewise is directed from the switch arm to the contact lever as well as the contact 32 and one of the throw or switch arms 27 and the circuit will also be directed through the circuit wire 38 leading from the battery to the bulb 15 and to the contact 25. Now when the steering wheel is again turned the trigger on the arm in the path of contact with the cam or wiper arm will be again actuated, but as the circuit is complete this will have no effect upon the bulb illuminated. After the driver rounds a corner or the like he will turn the steering wheel and post 18 to cause the vehicle to travel in a straight ahead direction. This will cause the cam to contact with the opposite side of the trigger and will swing the arm 27 against one end of the T-head 21 of the member 22 and as a consequence will swing the arm 22 as disclosed by Figure 8 of the drawings. After the cam lever passes off of the trigger the spring 34 will return the arm 27 to initial position and the springs 26 will return the contact arm 22 to its initial position. Thus the circuit is automatically broken by the turning of the steering post or shaft 18 as the springs 14 will return the shift or switch lever 6 to its normal neutral position. It, of course, is to be noted that the lamp bulb 15 is illuminated when the circuit is completed and that the swinging of the switch lever 6 shifts or moves the slide 8 to bring either of the openings 9 or 10 opposite the openings 11 or 12 so that the driver of the automobile has visible knowledge that the signal is being properly operated without necessitating him moving his head or otherwise endangering the proper steering of the automobile.

Obviously, and as previously inferred, the parts may be differently located upon the parts of an automobile than as disclosed by the drawings and the formation and construction of both the lamp housings and casings may be different from those shown and may be likewise differently attached, but it is thought that the foregoing description when read in connection with the accompanying drawings will fully and clearly set forth the construction and advantages of the invention so that further detailed description will not be required.

Having described the invention, I claim:

A control means for two lamp circuits, comprising a shaft having a metal cam fixed thereon and insulated therefrom, a wiper member in contact with the cam and wired to the circuits, pivotaly supported oppositely disposed angularly arranged arms normally sustained at the opposite sides of the cam, springs holding the arms in position, contact elements on the arms wired to the respective circuits, pivotally supported spring held metal triggers on the free end of each of the arms, an inverted T-shaped metal member pivoted between the arms, said member being wired to the circuits, spring means connected to the opposite sides of the said member normally sustaining the same in one position, and a contact wired to the circuits and in parallel with the wiper member and normally engaged by the T-shaped member, said cam when turned in either direction by the shaft arranged to ride over one of the triggers on either of the arms to cause the trigger to engage the contact on such arm and the cam when turned to its return position also engaging the trigger to swing the arm to bring the contact to engage with one end of the inverted T-shaped member to swing the said member out of engagement with the contact therefor, and the said cam after riding off of the trigger permitting the spring influencing arm to return to its initial position and also permitting the springs for the inverted T-shaped member to return the same to its initial position to again engage with the contact therefor.

JOHN L. BATCHELDER.